(12) United States Patent
Sugiyama

(10) Patent No.: US 10,998,974 B2
(45) Date of Patent: May 4, 2021

(54) OPTICAL DEVICE, OPTICAL TRANSCEIVER MODULE, AND METHOD OF PRODUCING OPTICAL DEVICE

(71) Applicant: Fujitsu Optical Components Limited, Kawasaki (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/505,139

(22) Filed: Jul. 8, 2019

(65) Prior Publication Data

US 2020/0044739 A1 Feb. 6, 2020

(30) Foreign Application Priority Data

Aug. 3, 2018 (JP) .............................. JP2018-146610

(51) Int. Cl.
*H04B 10/40* (2013.01)
*H04B 10/25* (2013.01)
(Continued)

(52) U.S. Cl.
CPC ............ *H04B 10/2589* (2020.05); *G01J 4/04* (2013.01); *H04B 10/0731* (2013.01); *H04B 10/40* (2013.01); *H04J 14/06* (2013.01)

(58) Field of Classification Search
CPC ................ H04B 10/2589; H04B 10/40; H04B 10/0731; G01J 4/04; G01J 1/0429; G01J 1/0228; H04J 14/06; G01M 11/33; G01M 11/00; G02B 6/124; G02B 6/126; G02B 6/13; G02B 6/4204; G02B 6/4213; G02B 6/12004; G02B 2006/12107
(Continued)

(56) References Cited

U.S. PATENT DOCUMENTS 8,724,100 B1 * 5/2014 Asghari .................... G01J 1/08
356/73
9,453,723 B1 * 9/2016 LeMaitre ............... G01B 11/27
(Continued)

FOREIGN PATENT DOCUMENTS

CN   105278040 A   1/2016
CN   105278040 B   5/2019

OTHER PUBLICATIONS

Dai et al, Silicon based on chip multiplexing technologies and devices for Peta bit optical interconnects, Nov. 2013, Nanophotonics vol. 3: Issue 4-5, All Document. (Year: 2013).*
(Continued)

*Primary Examiner* — Dibson J Sanchez
(74) *Attorney, Agent, or Firm* — Staas & Halsey LLP

(57) ABSTRACT

An optical device is formed on an optical IC chip. The optical device includes: an optical device circuit; a first optical waveguide that is coupled to the a first grating coupler; a second grating coupler; a polarization rotator that is coupled to the first grating coupler; a polarization beam combiner or a polarization beam splitter that is coupled to the polarization rotator and to the second grating coupler; and a second optical waveguide that is coupled to the polarization beam combiner or to the polarization beam splitter. The first optical waveguide and the second optical waveguide respectively extend to an edge of the optical IC chip.

3 Claims, 13 Drawing Sheets

(51) Int. Cl.
*G01J 4/04* (2006.01)
*H04B 10/073* (2013.01)
*H04J 14/06* (2006.01)

(58) Field of Classification Search
USPC .................................. 398/43–103, 135–139
See application file for complete search history.

(56) References Cited

U.S. PATENT DOCUMENTS

| | | | |
|---|---|---|---|
| 10,365,435 B1* | 7/2019 | Karimelahi | G02B 6/2726 |
| 2003/0235370 A1 | 12/2003 | Taillaert et al. | |
| 2010/0006784 A1 | 1/2010 | Mack et al. | |
| 2014/0043050 A1* | 2/2014 | Stone | G01J 1/08 |
| | | | 324/750.01 |
| 2015/0280856 A1* | 10/2015 | Nakashima | H04B 10/6162 |
| | | | 398/65 |
| 2015/0295675 A1* | 10/2015 | Sugama | G02B 6/42 |
| | | | 398/65 |
| 2016/0007105 A1 | 1/2016 | Jeong | |
| 2016/0041336 A1* | 2/2016 | Doerr | G02B 6/12004 |
| | | | 398/135 |
| 2016/0091664 A1 | 3/2016 | Doany et al. | |
| 2017/0082799 A1* | 3/2017 | Novack | G01R 31/308 |
| 2017/0146736 A1* | 5/2017 | Verslegers | G02B 6/30 |
| 2017/0195062 A1* | 7/2017 | Evans | G02F 1/2257 |
| 2017/0329080 A1* | 11/2017 | Sahni | H04B 10/40 |
| 2018/0062748 A1* | 3/2018 | Mack | G02B 6/124 |
| 2019/0089476 A1* | 3/2019 | Kish, Jr. | H04B 10/614 |
| 2020/0033228 A1* | 1/2020 | Piazza | G01R 31/318511 |
| 2020/0044739 A1* | 2/2020 | Sugiyama | G01J 1/0228 |
| 2020/0124792 A1* | 4/2020 | Cho | G02B 6/12004 |

OTHER PUBLICATIONS

Dai et al, Realization of a compact polarization splitter rotator on silicon, May 2016, Optics Letters, All Document. (Year: 2016).*
First Office Action dated May 11, 2020 in Chinese Patent Application No. 201910682188.5 (9 pages) (13 pages English Translation).
$2^{nd}$ Chinese Office Action dated Aug. 17, 2020 in related Chinese Patent Application No. 201910682188.5 (8 pages) (14 pages English Translation).

* cited by examiner

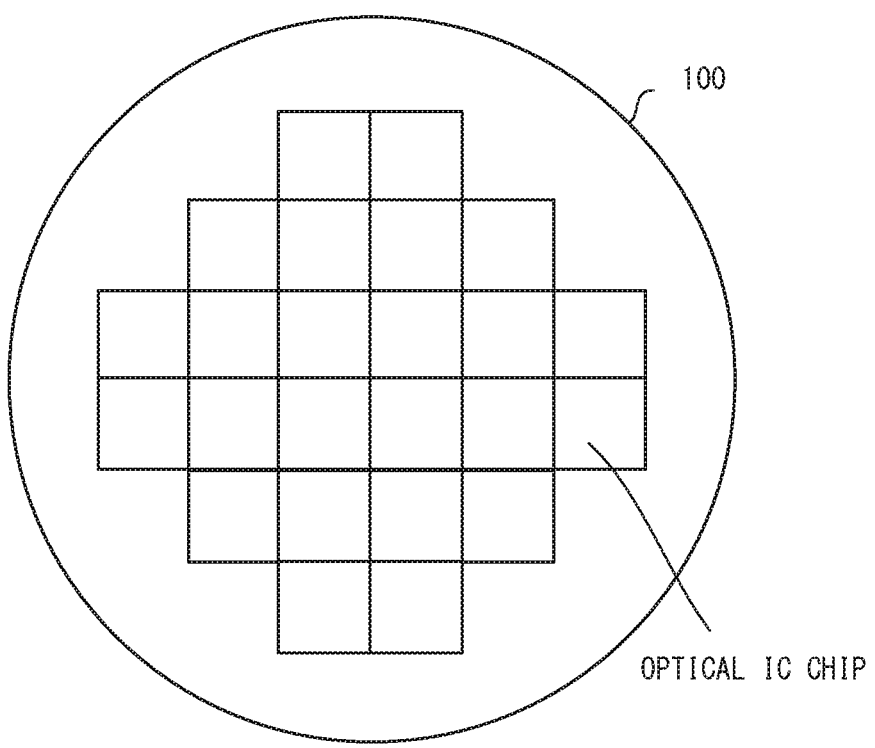
F I G. 3

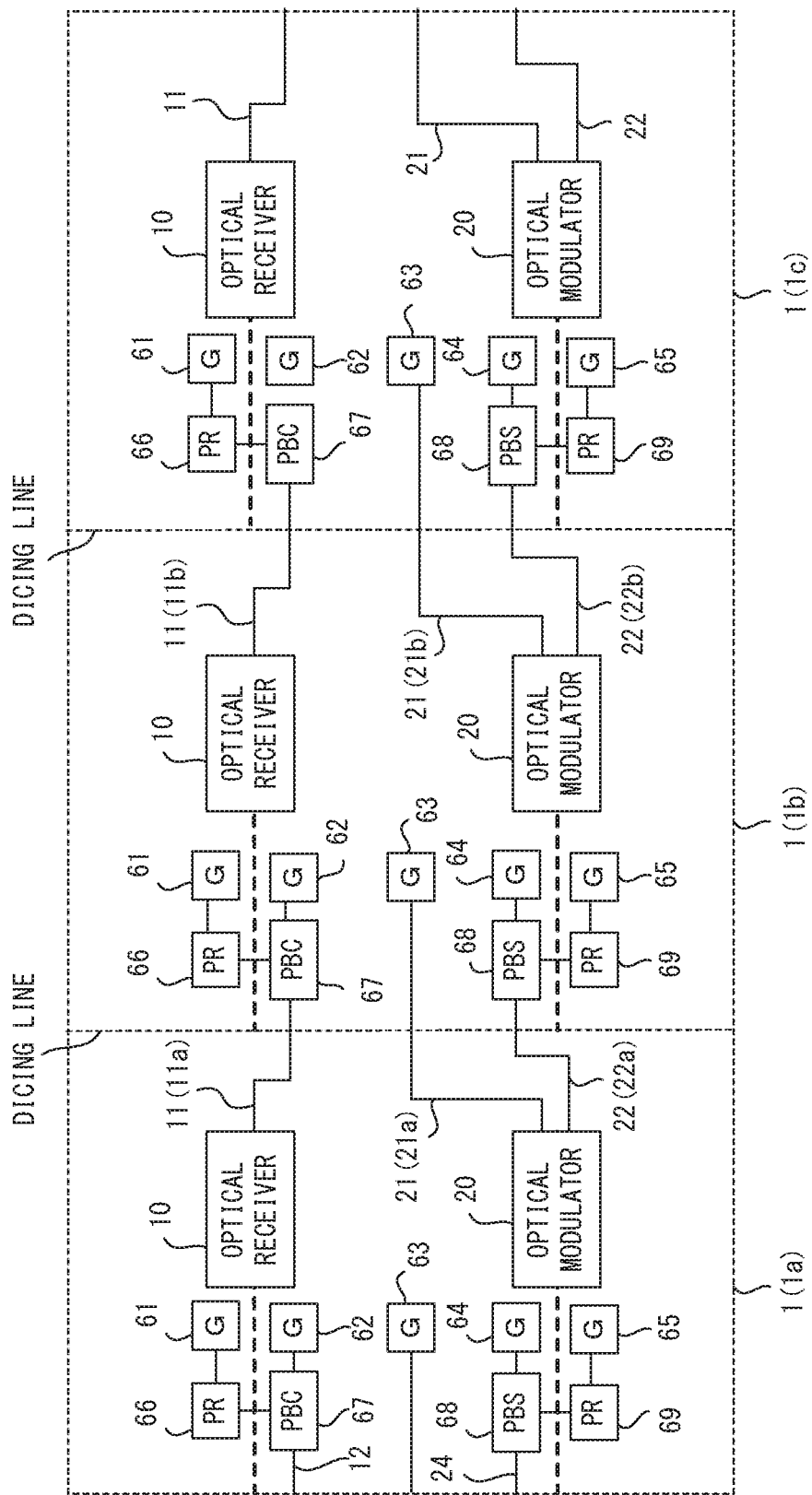
F I G. 6

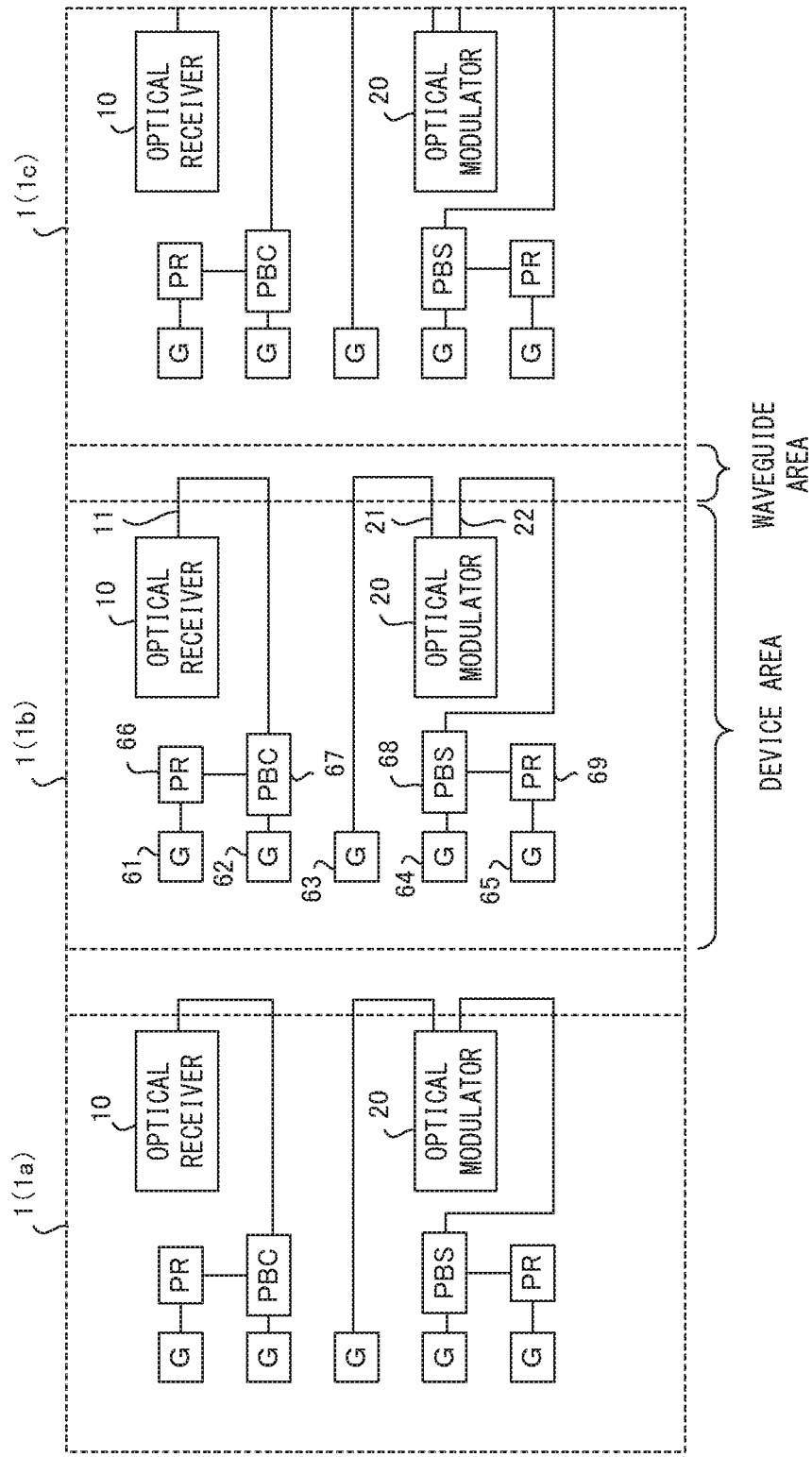
F I G. 7

OPTICAL DEVICE, OPTICAL TRANSCEIVER MODULE, AND METHOD OF PRODUCING OPTICAL DEVICE

CROSS-REFERENCE TO RELATED APPLICATIONS

This application is based upon and claims the benefit of priority of the prior Japanese Patent Application No. 2018-146610, filed on Aug. 3, 2018, the entire contents of which are incorporated herein by reference.

FIELD

The embodiments discussed herein are related to an optical device, an optical transceiver module, and a method of producing an optical device.

BACKGROUND

FIG. 1 illustrates an example of a testing method for an optical device. In this example, an optical device 1 is equipped with an optical receiver 10 and an optical modulator 20. The optical receiver 10 and the optical modulator 20 are implemented on an optical IC chip. Meanwhile, an optical waveguide 11 guides the input optical signal to the optical receiver 10. The optical waveguide 21 guides input CW light to the optical modulator 20. The optical waveguide 22 propagates the modulated optical signal generated by the optical modulator 20.

In the testing of the optical receiver 10, a light source (LD) 31 outputs an optical signal. A polarization controller 32 controls the polarization of the optical signal output from the light source 31. For example, in the TE polarization measurement, the polarization controller 32 controls the polarization of the optical signal output from the light source 31 so that a TE wave is input to the optical receiver 10. In the TM polarization measurement, the polarization controller 32 controls the polarization of the optical signal output from the light source 31 so that a TM wave is input to the optical receiver 10. The optical signal output from the polarization controller 32 enters the optical waveguide 11 via an optical fiber 33. The optical receiver 10 generates an electric signal RF_out that represents the input optical signal. Then, according to the electric signal RF_out, the quality (for example, the light sensitivity, extinction ratio, and the like) is measured for each polarization.

In the testing of the optical modulator 20, a light source (LD) 41 outputs CW (continuous wave) light. A polarization controller 42 generates single polarization CW light (for example, the TE wave) from the CW light output from the light source 41. The single polarization CW light output from the polarization controller 42 enters the optical waveguide 21 via an optical fiber 43. The optical modulator modulates the single polarization CW light with an electric signal RF_in to generate a modulated optical signal. The modulated optical signal is guided to a polarization beam splitter (PBS) 45 via the optical waveguide 22 and the optical fiber 44. The polarization beam splitter 45 splits the modulated optical light into a TE wave component and a TM wave component. Optical power meters 46 and 47 measures the TE wave component and the TM wave component, respectively. According to this configuration, the quality (for example, the insertion loss, extinction ratio, and the like) is measured.

The testing method illustrated in FIG. 1 is performed after optical IC chips are cut out from the wafer to each of the optical IC chips. At this time, it is necessary to align the optical fibers 33, 43, 44 on the edge of the optical waveguide 11, 21, 22, respectively, that are formed on the optical IC chip. Therefore, a long time is required for the testing of the optical device.

FIG. 2 illustrates another example of the testing method of an optical device. The testing method illustrated in FIG. 2 is performed on the wafer before respective optical IC chips are cut out from the wafer. Here, in order to perform the testing of the optical device on the wafer, a configuration in which light is cast on the surface of the wafer to guide the light to the optical receiver 10 and the optical modulator 20, and a configuration for obtaining the modulated optical signal generated by the optical modulator 20 from the surface of the wafer are required. For this reason, a grating coupler is formed near the optical device on the wafer.

In the example illustrated in FIG. 2, a GC area for forming grating couplers 51, 52, 53 is provided next to the device area for forming the optical device. The optical waveguides 11, 21, 22 extend to the GC area beyond the dicing line and are coupled to the grating couplers 51, 52, 53, respectively.

When the optical signal generated by the light source 31 enters the grating coupler 51 via the optical fiber 33, it is guided to the optical receiver 10 via the optical waveguide 11. In a similar manner, when the CW light generated by the light source 41 enters the grating coupler 52, it is guided to the optical modulator 20 via the optical waveguide 21. Meanwhile, the modulated optical signal generated by the optical modulator 20 is emitted via the optical waveguide 22 and the grating coupler 53, and therefore, by placing the optical fiber 44 near the grating coupler 53, the modulated optical signal is guided to the power meters 46, 47. Therefore, it is possible to test the optical device on the wafer before cutting out respective optical IC chips from the wafer.

Meanwhile, the configuration to couple the grating coupler or the optical fiber to the optical waveguide is disclosed in U.S. Patent Application Publication No. 2003/0235370 and U.S. Patent Application Publication No. 2016/0091664, for example.

As described above, by forming a grating coupler near the optical device, it is possible to perform testing of the optical device on the wafer before cutting out respective optical IC chips from the wafer. However, the loss of the TM wave is large in the grating coupler. Therefore, in the configuration illustrated in FIG. 2, variations by wafer or by optical IC chip may become large, and credibility of measurement results may be lowered.

SUMMARY

According to an aspect of the embodiments, an optical device is formed on an optical IC (integrated circuit) chip. The optical device includes: an optical device circuit; a first optical waveguide that is coupled to the a first grating coupler; a second grating coupler; a polarization rotator that is coupled to the first grating coupler; a polarization beam combiner or a polarization beam splitter that is coupled to the polarization rotator and to the second grating coupler; and a second optical waveguide that is coupled to the polarization beam combiner or to the polarization beam splitter. The first optical waveguide and the second optical waveguide respectively extend to an edge of the optical IC chip.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example of a wafer on which a plurality of optical IC chips are formed;

FIG. 6 illustrates an example of optical IC chips according to the second embodiment;

FIG. 7 illustrates a variation example of optical IC chips according to the second embodiment;

DESCRIPTION OF EMBODIMENTS

FIG. 3 illustrates an example of a wafer on which a plurality of optical IC chips are formed. A plurality of optical IC chips are formed in the surface area of a wafer 100. In the example illustrated in FIG. 3, 24 optical IC chips are formed on the wafer 100.

In this example, each of the optical IC chips provides an optical device including an optical receiver and an optical modulator (that is, the optical device is an optical transceiver). Therefore, a plurality of optical devices may be obtained by dicing from the wafer 100. The test of each optical device is performed on the wafer 100 before cutting out the respective optical IC chips from the wafer 100.

First Embodiment

Figure 1:
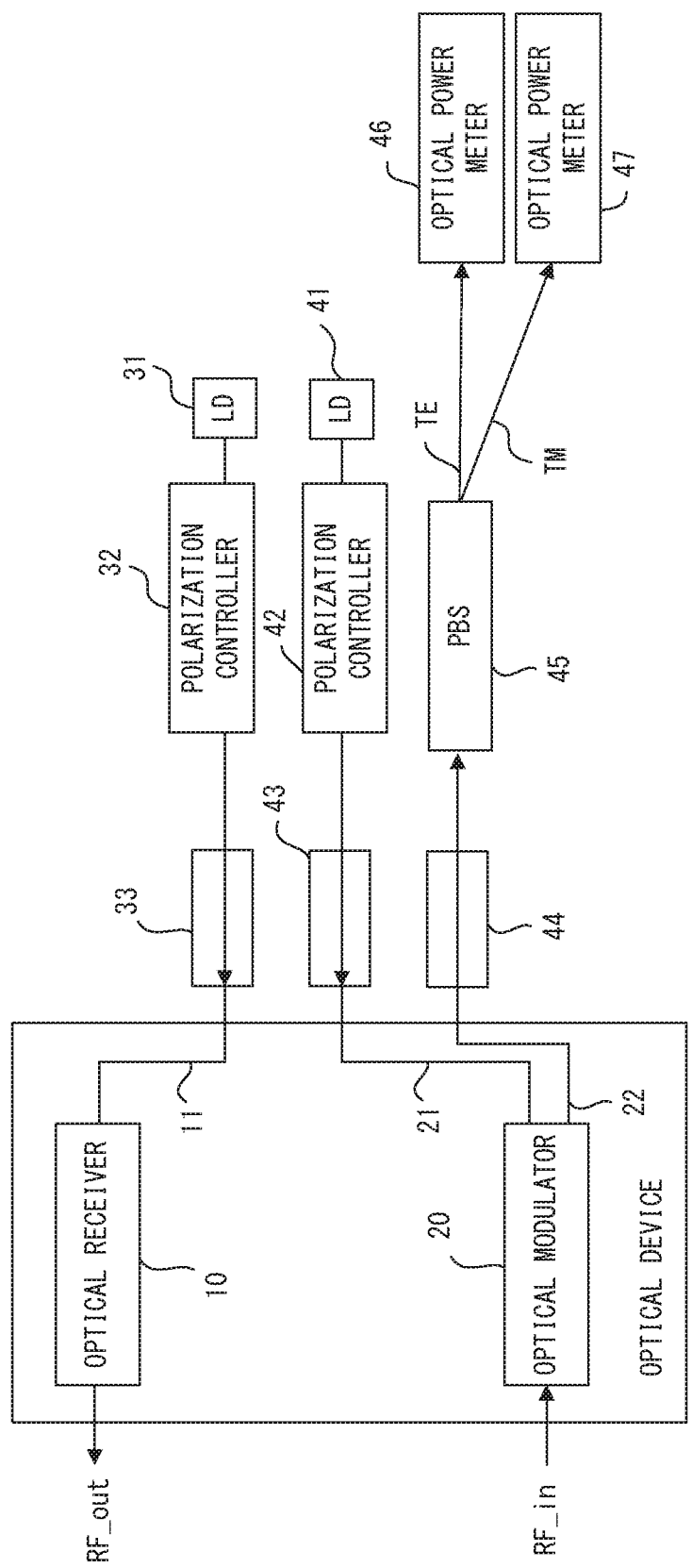
FIG. 1 illustrates an example of a testing method for an optical device.
Figure 2:
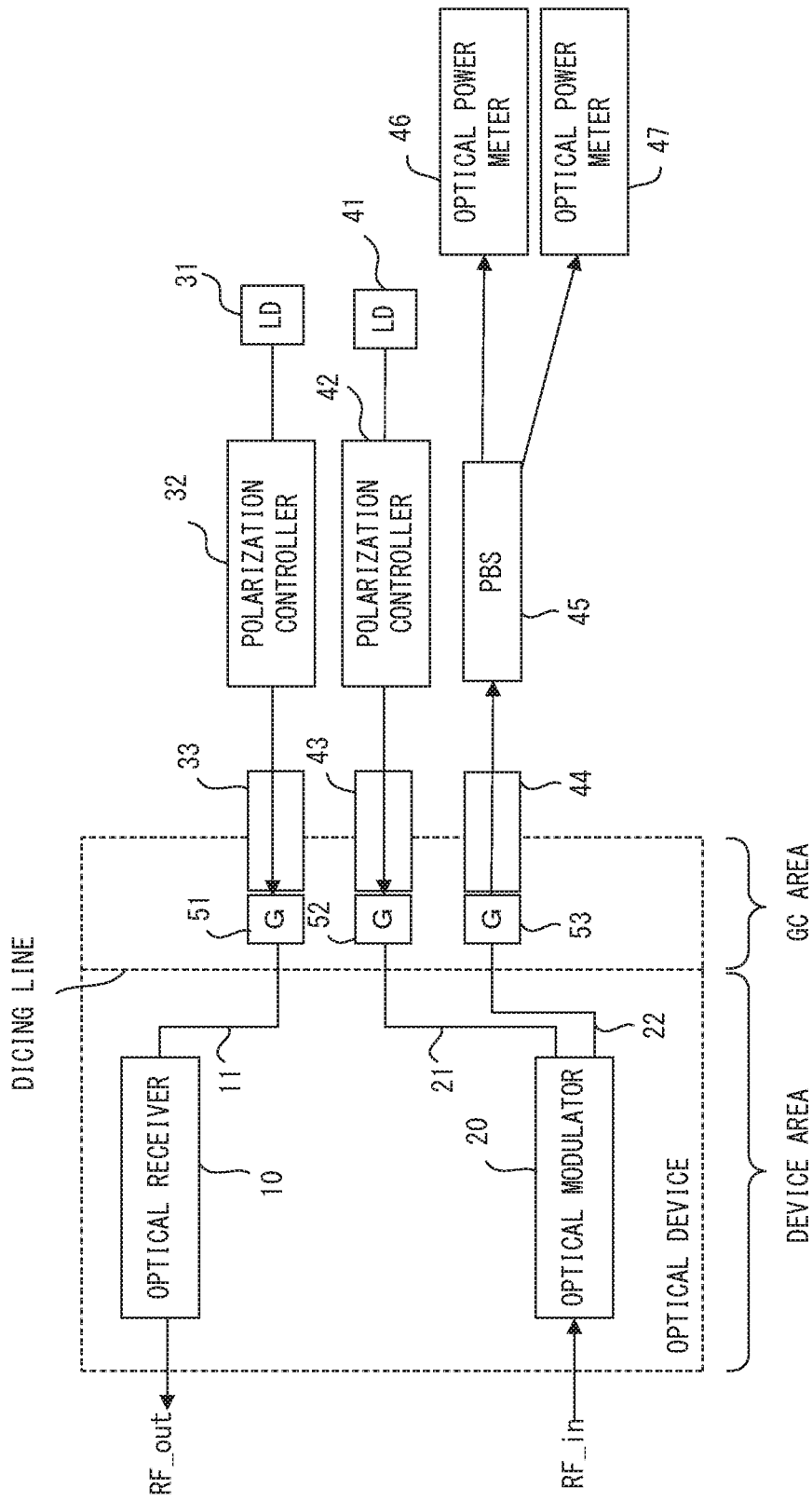
FIG. 2 illustrates another example of a testing method for an optical device.
Figure 4:
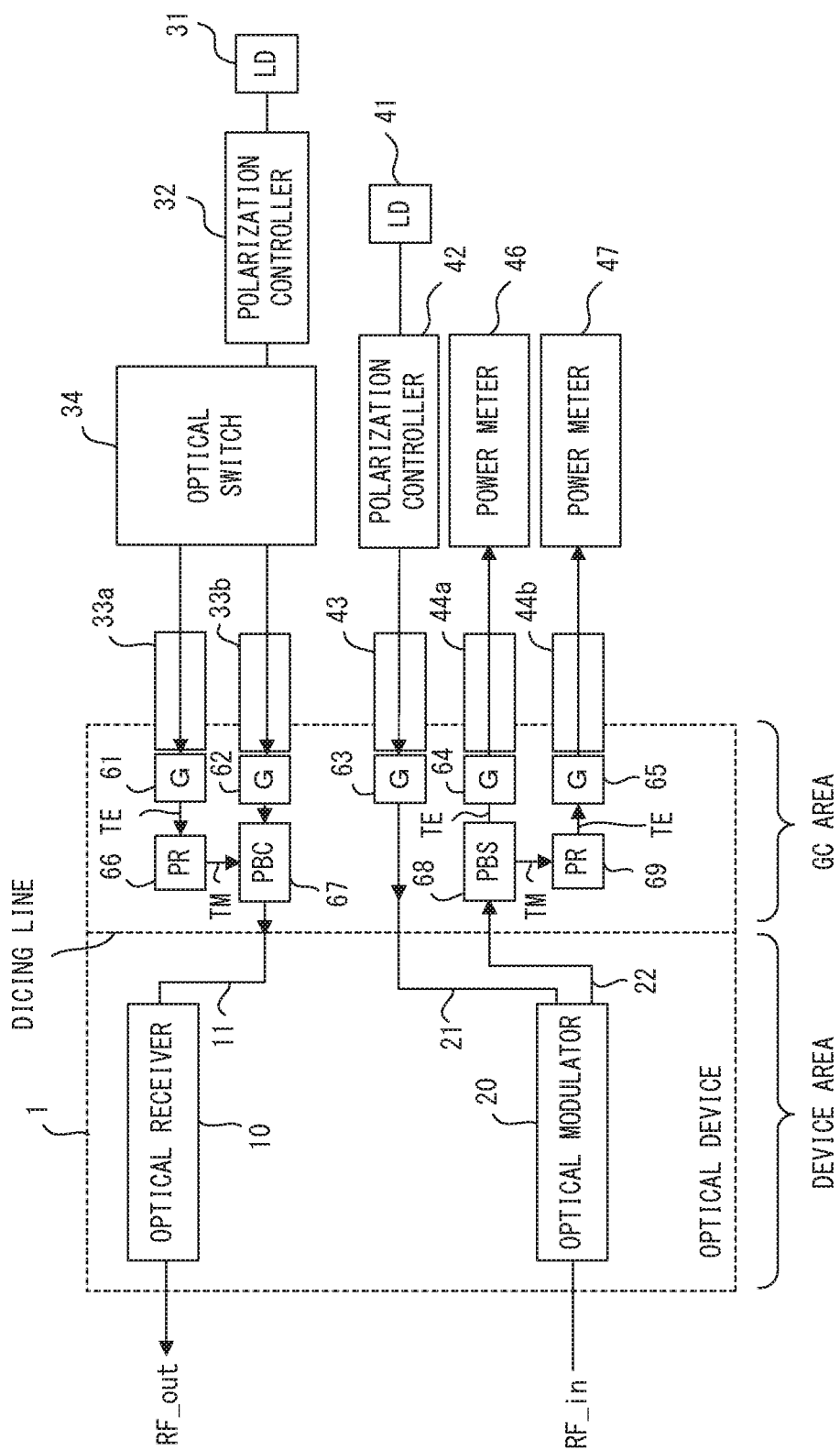
FIG. 4 illustrates an example of an optical IC chip according to the first embodiment.

FIG. 4 illustrates an example of an optical IC chip according to the first embodiment. In this example, an optical IC chip 1 is equipped with a device area in which the optical device is formed, and a GC area in which a grating coupler or the like is formed, as illustrated in FIG. 4. Here, a dicing line is prepared between the device area and the GC area. That is, after the testing of the optical device is completed, the GC area is cut off from the device area.

In the example described below, the optical device is equipped with the optical receiver 10 and the optical modulator 20, but the present invention is not limited to this configuration. That is, the optical device may be configured to be equipped with either the optical receiver or the optical modulator 20. Meanwhile, the optical receiver 10 and the optical modulator 20 are respectively an example of an optical device circuit formed on an optical IC chip.

In the device area, the optical receiver 10, the optical modulator 20, and the optical waveguides 11, 21, 22 are formed. The optical waveguide 11 is coupled to the optical input port of the optical receiver 10. The optical waveguide 21 is coupled to the optical input port of the optical modulator 20. The optical waveguide 22 is coupled to the optical output port of the optical modulator 20.

Grating couplers 61 through 65, a polarization rotator 66, a polarization beam combiner 67, a polarization beam splitter 68, and a polarization rotator 69 are provide in the GC area. Meanwhile, G represents the grating coupler, PR represents the polarization rotator, PBC represents the polarization beam combiner, and PBS represents the polarization beam splitter.

Figure 5:
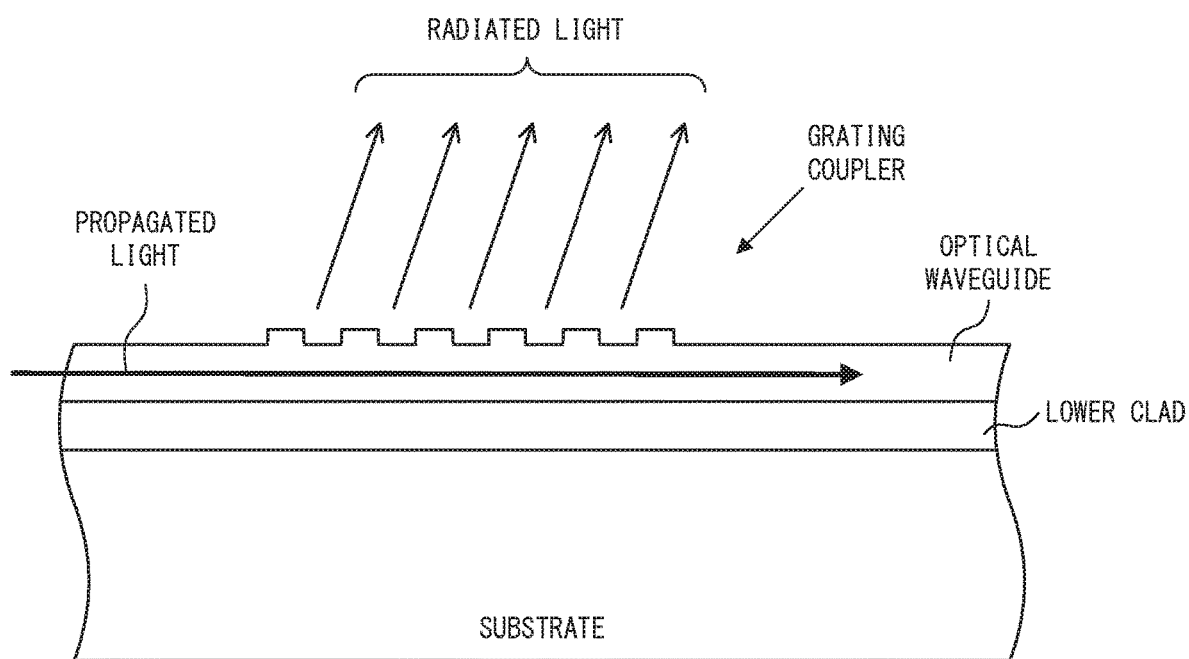
FIG. 5 illustrates an example of radiation by a grating coupler.

The grating coupler is formed by providing grating on the waveguide surface, for example. Then, as illustrated in FIG. 5, when propagated light that propagates via the optical waveguide passes through the grating coupler, a part of the propagated light is emitted in a specified direction with respect to the substrate. In the description below, the direction in which a part of propagated light is emitted by the grating coupler may be referred to as the "diffracted radiation direction".

Therefore, by placing the tip surface of the optical fiber near the grating coupler, it becomes possible to obtain light propagating via the optical waveguide. In addition, by placing the tip surface of the optical fiber near the grating coupler, it becomes possible for light to enter the optical waveguide via the optical fiber. That is, the grating coupler is able to optically couple the optical fiber and the optical waveguide on the surface of the optical IC chip.

It is preferable for the grating couplers 61 through 65 to be formed at equal spacing on a straight line. In addition, it is preferable for the grating couplers 61 through 65 to be formed so that their diffracted radiation directions become the same.

The polarization rotator 66 is optically coupled to the grating coupler 61. For example, the grating coupler 61 and the polarization rotator 66 are coupled by an optical waveguide. Meanwhile, the polarization rotator 66 makes the polarization of the input light rotate by 90 degrees. Therefore, when a TE wave is input to the polarization rotator 66, a TM wave is output from the polarization rotator 66.

The polarization beam combiner 67 is optically coupled to the polarization rotator 66 and the grating coupler 62. For example, the polarization rotator 66 and the polarization beam combiner 67 are coupled by an optical waveguide. The grating coupler 62 and the polarization beam combiner 67 are coupled by an optical waveguide. Further, the polarization beam combiner 67 is optically coupled to the optical waveguide 11. That is, the optical waveguide 11 extends to the GC area from the device area beyond the dicing line.

The grating coupler 63 is optically coupled to the optical waveguide 21. That is, the optical waveguide 21 extends to the GC area from the device area beyond the dicing line.

The polarization beam splitter 68 is optically coupled to the optical waveguide 22. That is, the optical waveguide 22 extends to the GC area from the device area beyond the dicing line. In addition, the polarization beam splitter 68 is optically coupled to the grating coupler 64 and the polarization rotator 69. For example, the polarization beam splitter 68 and the grating coupler 64 are coupled by an optical waveguide. The polarization beam splitter 68 and the polarization rotator 69 are coupled by an optical waveguide. Meanwhile, the polarization beam splitter 68 splits the input light into a pair of polarization components that are orthogonal to each other (that is, the TE wave and the TM wave).

In this example, the TE wave and the TM wave output from the polarization beam splitter 68 are guided to the grating coupler 64 and the polarization rotator 69, respectively.

The polarization rotator 69 is optically coupled to the grating coupler 65. For example, the polarization rotator 69 and the grating coupler 65 are coupled by an optical waveguide. Meanwhile, polarization rotator 69 makes the polarization component of the input light rotate by 90 degrees. Therefore, when the TM wave is input to the polarization rotator 69, the TE wave is output from the polarization rotator 69.

Meanwhile, it is preferable that the polarization beam combiner 67 and the polarization beam splitter 68 have the same configuration and are formed according to the same production process. In this case, the production cost is reduced. In addition, in a configuration in which the optical receiver 10 performs coherent detection, the optical waveguide 21 may be coupled not only to the optical modulator 20 but also to the optical receiver 10.

In the testing of the optical receiver 10, the tip surface of the optical fibers 33a, 33b are placed near the grating couplers 61, 62, respectively. At this time, the optical fibers 33a, 33b are placed in the diffracted radiation direction with respect to the grating couplers 61, 62.

The light source 31 output an optical signal. The optical signal generated by the light source 31 may be CW light. The polarization controller 32 controls the polarization of the optical signals output from the light source 31. In this example, the polarization controller 32 controls the polarization of the optical signal to generate a TE wave optical signal.

The optical switch 34 guides output light from the polarization controller 32 to the optical fiber 33a or 33b. Specifically, in the measurement of the TE characteristics of the optical receiver 10, the optical switch 34 guides the TE wave optical signal output from the polarization controller 32 to the optical fiber 33b. In this case, the TE wave optical signal is guided to the optical receiver 10 via the optical fiber 33b, the grating coupler 62, the polarization beam combiner 67, and the optical waveguide 11. Meanwhile, in the measurement of the TM characteristics of the optical receiver 10, the optical switch 34 guides the TE wave optical signal output from the polarization controller 32 to the optical fiber 33a. In this case, the TE wave optical signal is guided to the polarization rotator 66 via the optical fiber 33a and the grating coupler 61 and is converted to a TM wave optical signal. This TM wave optical signal is guided to the optical receiver 10 via the polarization beam combiner 67 and the optical waveguide 11.

The optical receiver 10 generates an electric signal RF_out that represents an input optical signal. Then, according to the electric signal RF_out, the characteristics (for example, the light sensitivity, extinction ratio, and the like) of the optical receiver 10 are measured for each of the TE wave and the TM wave.

In the testing of the optical modulator 20, the tip surface of the optical fibers 43, 44a, 44b are placed near the grating couplers 63, 64, 65, respectively. At this time, the optical fibers 43, 44a, 44b are placed in the diffracted radiation direction with respect to the grating couplers 63, 64, 65.

The light source 41 output CW light. The polarization controller 42 controls the polarization of the CW light output from the light source 41. In this example, the polarization controller 42 controls the polarization of the CW light output from the light source 31 to generate TE wave CW light. The TW wave CW light is guided to the optical modulator 20 via the optical fiber 43, the grating coupler 63, and the optical waveguide 21.

The optical modulator 20 modulates the TE wave CW light with the electric signal RF_in to generate a modulated optical signal. The modulated optical signal is guided to the polarization beam splitter 68 via the optical waveguide 22. The polarization beam splitter 68 splits the modulated optical signal into the TE wave component and the TM wave component.

The TE wave component of the modulated optical signal is guided to the grating coupler 64. Therefore, the TE wave component of the modulated optical signal is guided to the optical power meter 46 via the optical fiber 44a. Meanwhile, the TM wave component of the modulated optical signal is guided to the polarization rotator 69. Therefore, the TE wave component of the modulated optical signal is obtained at polarization rotator 69. Then, the TE wave component of the modulated optical signal output from the polarization rotator 69 is guided to the power meter 47 via the optical fiber 44b. Therefore, the characteristics (for example, the insertion loss, extinction ratio, and the like) of the optical modulator 20 are measured for each of the TE wave and the TM wave.

As described above, in the first embodiment, the polarization components of the light passing through the grating couplers 61 through 65 are all the TE wave. Therefore, even in the configuration in which the grating coupler is used to couple the optical fiber and the optical waveguide on the optical IC chip, it possible to accurately measure the characteristics of the optical device that transmits and receives polarization multiplexed optical signals. In addition, when the grating couplers 61 through 65 are configured at equal spacing on a straight line, it is possible to perform testing of the optical device using an optical fiber array that accommodates the optical fibers 33a, 33b, 43, 44a, 44b. That is, since there is no need to perform position alignment of the optical fibers 33a, 33b, 43, 44a, 44b individually, the time required for the testing of the optical device is reduced. Furthermore, the GC area is cut off from the device area after the completion of the testing of the optical device, and therefore, when the optical device is actually used, no noises are caused by reflections on the grating coupler.

Second Embodiment

In the configuration illustrated in FIG. 4, the GC area is required for forming the grating coupler or the like in addition to the device area for forming the optical device. For this reason, the number of optical IC chips that can be formed on one wafer may be reduced. The second embodiment solves or alleviates this problem.

FIG. 6 illustrates an example of optical IC chips according to the second embodiment. FIG. 6 illustrates, among the plurality of optical IC chips formed on the wafer, three optical IC chips 1a through 1c arranged consecutively.

The configuration of each of the optical IC chips 1 (1a through 1c) is substantially the same as each other. That is, each of the optical IC chips 1 is equipped with the optical receiver 10, the optical modulator 20, the optical waveguides 11, 21, 22, the grating couplers 61 through 65, the polarization rotators 66, 69, the polarization beam combiner 67, and the polarization beam splitter 68. In FIG. 6, the broken line connected to the optical receiver 10 represents the wiring pattern that propagates the RF_out signal, and the broken line connected to the optical modulator 20 represents the wiring pattern that propagates the RF_in signal. In the description below, the optical circuit including the grating couplers 61 through 65, the polarization rotator 66, 69, the polarization beam combiner 67, and the polarization beam splitter 68 may be referred to as a "grating coupler circuit".

In the second embodiment, the grating coupler circuit formed in each of the optical IC chips 1 is coupled to the optical receiver 10 and the optical modulator 20 formed in an adjacent optical IC chip 1. In the example illustrated in FIG. 6, the grating coupler circuit formed in the optical IC chip 1b is coupled to the optical receiver 10 and the optical modulator 20 formed in the optical IC chip 1a, and the grating coupler circuit formed in the optical IC chip 1c is coupled to the optical receiver 10 and the optical modulator 20 formed in the optical IC chip 1b.

In order to realize the configuration described above, the optical waveguides 11, 21, 22 are respectively formed over two optical IC chips across the dicing line. That is, the optical waveguides 11a, 21a, 22a are respectively formed over the optical IC chip 1a and the optical IC chip 1b. In addition, the optical waveguide 11b, 21b, 22b are respectively formed over the optical IC chip 1b and the optical IC chip 1c.

Specifically, the optical waveguide 11a couples the optical receiver 10 of the optical IC chip 1a and the polarization beam combiner 67 of the optical IC chip 1b. The optical waveguide 21a couples the optical modulator 20 of the optical IC chip 1a and the grating coupler 63 of the optical IC chip 1b. The optical waveguide 22a couples the optical modulator 20 of the optical IC chip 1a and the polarization beam splitter 68 of the optical IC chip 1b. In a similar manner, the optical waveguide 11b couples the optical receiver 10 of the optical IC chip 1b and the polarization beam combiner 67 of the optical IC chip 1c. The optical waveguide 21b couples the optical modulator 20 of the optical IC chip 1b and the grating coupler 63 of the optical IC chip 1c. The optical waveguide 22b couples the optical modulator 20 of the optical IC chip 1b and the polarization beam splitter 68 of the optical IC chip 1c.

In a similar manner as in the first embodiment, the testing of each of the optical IC chips is performed on the wafer before the respective optical IC chips 1 are cut out from the wafer. However, the testing of each of the optical IC chips 1 is performed using the grating coupler circuit formed in an adjacent optical IC chip 1. For example, when the testing of the optical receiver 10 and the optical modulator 20 formed in the optical IC chip 1a is performed, the TE wave optical signal and the TE wave CW light are input via the grating couplers 61 through 63 formed in the optical IC chip 1b, and the modulated optical signal is output via the grating couplers 64 through 65 formed on the optical IC chip 1b.

As described above, in the second embodiment, the grating coupler circuit for the testing of each of the optical IC chips is formed in another optical IC chip. That is, there is no need to provide a dedicated area for forming the grating coupler circuit. Therefore, compared to the first embodiment, according to the second embodiment, the number of optical IC chips that can be formed on one wafer may be increased.

Meanwhile, for the optical device in which the optical receiver and the optical modulator are formed on the optical IC chip, in many cases, the space between the optical receiver and the optical modulator is designed to be larger than a specified threshold space, in order to suppress crosstalk. For this reason, in the optical IC chip in which such an optical device is composed, there is an empty space. Therefore, by placing the grating coupler circuit using this empty space, the grating coupler circuit for an adjacent chip may be formed in each of the optical IC chips without increasing the size of each of the optical IC chips.

After the testing of each of the optical IC chips is completed, each of the optical IC chips is cut out by dicing. Therefore, each of the optical devices is equipped with the optical receiver 10, the optical modulator 20, and the grating coupler circuit for an adjacent chip. For example, the optical device realized by the optical IC chip 1b is equipped with the optical receiver 10, the optical modulator 20, the optical waveguides 11b, 21b, 22b, the grating couplers 61 through 65, the polarization rotators 66, 69, the polarization beam combiner 67, the polarization beam splitter 68, and the optical waveguides 11a, 21a, 22a. Here, in the optical IC chip 1b cut out by dicing, the optical waveguides 11b, 21b, 22b extend to the edge of the optical IC chip 1b (the chip edge that was in contact with the optical IC chip 1c before dicing). In addition, in the optical IC chip 1b cut out by dicing, the optical waveguides 11a, 21a, 22a extend to the other edge of optical IC chip 1b (the chip edge that was in contact with the optical IC chip 1a before dicing).

FIG. 7 illustrates a variation example of optical IC chips according to the second embodiment. In the example illustrated in FIG. 6, the grating coupler circuit for the testing of each of the optical IC chips is formed in another optical IC chip. In contrast, in the example illustrated in FIG. 7, the optical device circuit (the optical receiver 10 and the optical modulator 20) and the grating coupler circuit for this optical device circuit are formed in the same optical IC chip. However, the optical waveguide 11 coupled to the optical receiver 10 extends to the polarization beam combiner 67, passing through a waveguide area. The optical waveguide 21 coupled to the optical modulator 20 extends to the grating coupler 63, passing through the waveguide area. The optical waveguide 22 coupled to the optical modulator 20 extends to the polarization beam splitter 68, passing through the waveguide area.

After the completion of the testing of the optical device, the waveguide area is cut off from the device area by dicing. Therefore, in the optical IC chip after dicing, the optical waveguide 11 coupled to the optical receiver 10, and the optical waveguides 21, 22 coupled to the optical modulator 20 respectively extend to the edge of the chip. In addition, the optical waveguide 11 coupled to the polarization beam combiner 67, the optical waveguide 21 coupled to the grating coupler 63, and the optical waveguide 22 coupled to the polarization beam splitter 68 are also respectively formed extending to the edge of the chip.

Figure 8:
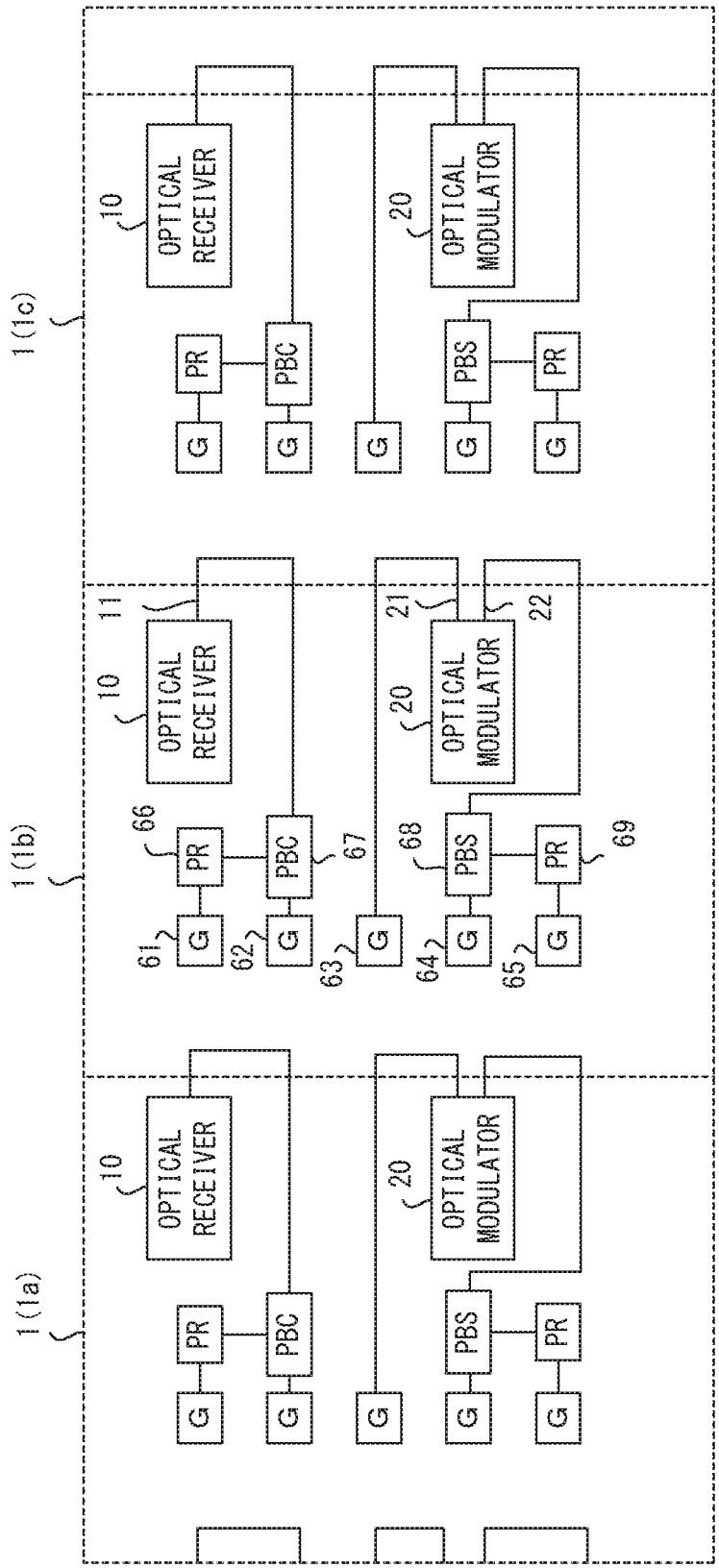
FIG. 8 illustrates another variation example of optical IC chips according to the second embodiment.

FIG. 8 illustrates another variation example of optical IC chips according to the second embodiment. In the configuration illustrated in FIG. 8, in a similar matter as the configuration illustrated in FIG. 7, the optical device circuit (the optical receiver 10 and the optical modulator 20) and the grating coupler circuit for the optical device circuit are formed in the same optical IC chip. However, the optical waveguide 11 coupled to the optical receiver 10 extends to the polarization beam combiner 67 passing through the area in which the adjacent chip is formed. The optical waveguide 21 coupled to the optical modulator 20 extends to the grating coupler 63 passing through the area in which the adjacent chip is formed. The optical waveguide 22 coupled to the optical modulator 20 extends to the polarization beam splitter 68 passing through the area in which the adjacent chip is formed.

After the completion of the testing of the optical device, the optical IC chips are separated from each other by dicing. Therefore, in the optical IC chip after dicing, the optical waveguide 11 coupled to the optical receiver 10, and the optical waveguides 21, 22 coupled to the optical modulator 20 respectively extend to the edge of the chip. In addition, the optical waveguide 11 coupled to the polarization beam combiner 67, the optical waveguide 21 coupled to the grating coupler 63, and the optical waveguide coupled to the polarization beam splitter 68 also respectively extend to the edge of the chip.

Third Embodiment

Figure 9:
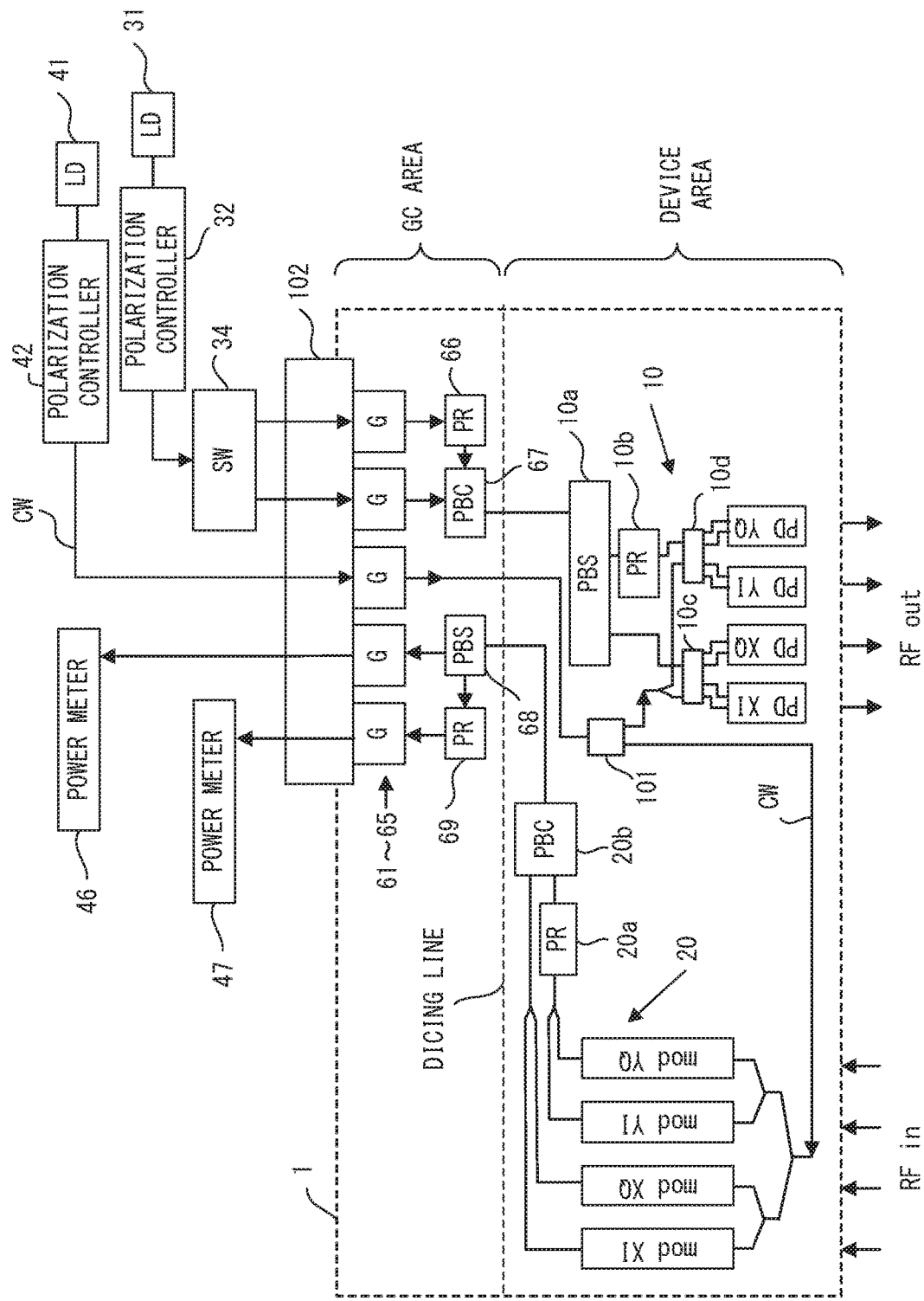
FIG. 9 illustrates an example of an optical IC chip according to the third embodiment.

FIG. 9 illustrates an example of an optical IC chip according to the third embodiment. The optical IC chip 1 illustrated in FIG. 9 has a device area and a GC area in a similar manner as in the first embodiment, but the third embodiment is not limited to this configuration. That is, the optical IC chip according to the third embodiment may be configured without the GC are and with the grating coupler circuit formed in the same manner as in the second embodiment.

In addition to the optical receiver 10 and the optical modulator 20, a branch coupler 101 is formed in the device area. The branch coupler 101 is optically coupled to the optical receiver 10 and the optical modulator 20. Then, when the TE wave CW light output from the polarization controller 42 is given to the optical IC chip 1 via an optical fiber array 102, the branch coupler 101 splits the TE wave CW light and guide it to the optical receiver 10 and the optical modulator 20. Meanwhile, the optical receiver 10 uses this CW light as local oscillation light LO for coherent detection.

The optical receiver 10 is equipped with the polarization beam splitter (PBS) 10a, the polarization rotator (PR) 10b, the 90-degree optical hybrid circuits 10c, 10d, the photodetectors PD_XI, PD_XQ, PD_YI, PD_YQ, as illustrated in FIG. 9. Then, when the TE wave optical signal output from the polarization controller 32 is given to the optical IC chip 1 via the optical fiber array 102, the optical signal is guided to the PBS 10a.

The polarization beam splitter 10a splits the input optical signal into the TE wave component optical signal and the TM wave component optical signal. The TE wave component optical signal obtained by the polarization beam splitter 10a is guided to the 90-degree optical hybrid circuit 10c. The 90-degree optical hybrid circuit 10c extracts the I (In-Phase) component and the Q (Quadrature) component of the input optical signal, using the CW light given via the branch coupler 101. The photodetector PD_XI and the photodetector PD_XQ generate electric signals that represent the I component and the Q component of the TE wave component optical signal.

The TM wave component optical signal obtained by the polarization beam splitter 10a is guided to the 90-degree optical hybrid circuit 10d after its polarization is adjusted at the polarization rotator 10b. The 90-degree optical hybrid circuit 10d extracts the I component and the Q component of the input optical signal, using the CW light given via the branch coupler 101. The photodetector PD_YI and the photodetector PD_YQ generate electric signals that represent the I component and the Q component of the TM wave component optical signal. Then, the electric signal RF_out generated by the photodetectors PD_XI, PD_XQ, PD_YI, PD_YQ are guided to the measurement instrument not presented in the drawing.

The optical modulator 20 is equipped with the modulators XI, XQ, YI, YQ, the polarization rotator (PR) 20a, and the polarization beam combiner (PBC) 20b, as illustrated in FIG. 9. Then, the CW light given from the branch coupler 101 to the optical modulator 20 is guided to the modulators XI, XQ, YI, YQ.

The modulators XI, XQ, YI, YQ respectively modulate the CW light with the electric signal RF_in to generate a modulated optical signal. The output optical signal of the modulators XI, XQ guided to the polarization beam combiner 20b. The output optical signal of the modulators XI, XQ is guided to the polarization beam combiner 20b after its polarization is adjusted at polarization rotator 20a. Meanwhile, the optical modulator 20 may be equipped with a variable optical attenuator that adjusts the power of the modulated optical signal.

In the optical IC chip 1 configured as described above, it is preferable that the polarization rotators 10b, 20a, 66, and 69 have the same configuration as each other and are formed according to the same production process. In addition, it is preferable that the polarization beam combiners 20b and 67 have the same configuration as each other and are formed according to the same production process. Further, it is preferable that the polarization beam splitters 10a and 68 have the same configuration as each other and are formed according to the same production process. In this case, it is possible to form the polarization rotator, the polarization beam combiner, and the polarization beam splitter in the grating coupler circuit without changing the process to produce the optical device.

Fourth Embodiment

In the first through third embodiments, the input light to the optical device passes through the grating coupler, the polarization beam combiner, and the polarization rotator in the grating coupler circuit. In addition, the modulated optical signal output from the optical device passes through the polarization beam splitter, the polarization rotator, and the grating coupler in the grating coupler circuit. For this reason, in order to accurately estimate the power of the light input into the optical device and the light output from the optical device, it is preferable that the loss in the grating coupler circuit can be estimated.

Figure 10:
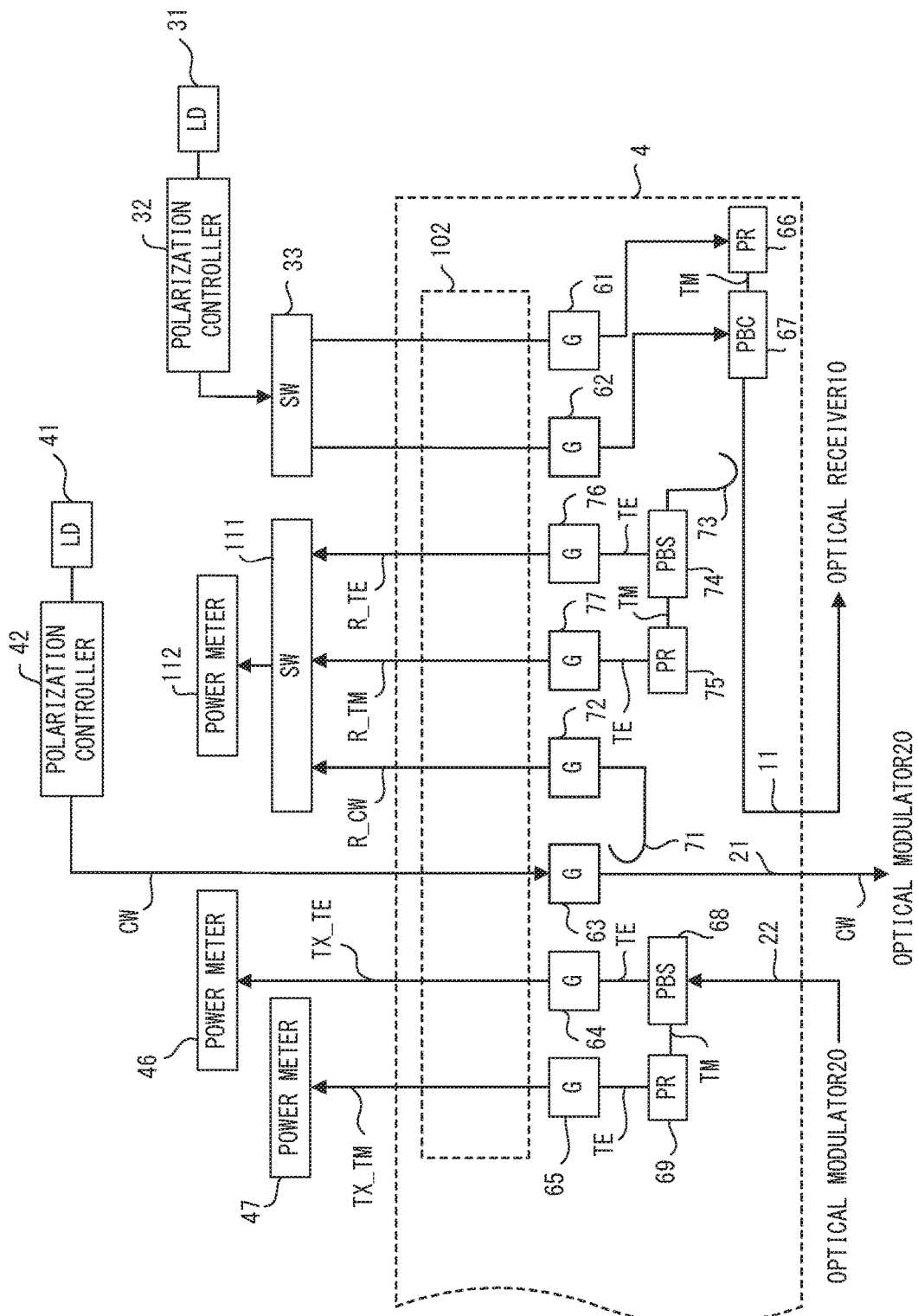
FIG. 10 illustrates an example of a grating coupler circuit according to the fourth embodiment.

FIG. 10 illustrates an example of a grating coupler circuit according to the fourth embodiment. Meanwhile, a grating coupler circuit 4 may be applied to both the first embodiment and the second embodiment. That is, the grating coupler circuit 4 according to the fourth embodiment may be formed in the GC area illustrated in FIG. 4 or may be formed in each of the optical IC chips as illustrated in FIG. 6.

The grating coupler circuit 4 is equipped with, in addition to the grating coupler circuit according to the first or second embodiment, tap waveguides 71, 73, grating couplers 72, 76, 77, a polarization beam splitter 74, and a polarization rotator 75. The tap waveguides 71, 73 may be realized as an MMI coupler or a directional coupler.

The tap waveguide 71 branches CW light input to the optical waveguide 21 via the grating coupler 63 and guides it as reference light R_CW to the grating coupler 72. Then, the reference light R_CW emitted from the grating coupler 72 is guided to an optical switch 111 via the optical fiber array 102.

The tap waveguide 73 branches the optical signal output from the polarization beam combiner 67 to the optical waveguide 11 and guides it to the polarization beam splitter 74. The polarization beam splitter 74 splits the input optical signal into the TE wave component and the TM wave component. The TE wave component output from the polarization beam splitter 74 is emitted via the grating coupler 76 as a reference light R_TE. The TM wave component output from the polarization beam splitter 74 is converted into the TE wave component by the polarization rotator 75 and emitted via the grating coupler 77 as a reference light R_TM. The light (R_TE, R_TM) emitted from the grating coupler 76, 77 is guided to the optical switch 111 via the optical fiber array 102.

The optical switch 111 selects the light emitted from grating coupler 72, 76, 77 and guides it to the power meter 112. The power meter 112 measures the power of the light selected by the optical switch 111.

When the testing of the optical IC chip on which the grating coupler circuit 4 is formed is performed, as illustrated in FIG. 4 or FIG. 9, the optical modulator 20 generates the modulated optical signal from the CW light generated by the light source 41. Therefore, it is preferable that, as one of the tests for the optical modulator 20, the ratio of "the power of the CW light input to the optical device" and "the power of the modulated optical signal output from the optical device" is detected. However, in the configuration having the grating couplers 61 through 65, it is difficult to directly detect the power ratio mentioned above.

For example, when the power of the TE wave component of the modulated optical signal is measured using the power meter 46, it is preferable to consider the loss in the polarization beam splitter 68 and the grating coupler 64 provided between the optical modulator 20 and the power meter (hereinafter, the TE path loss). In addition, when the power of the TM wave component of the modulated optical signal is measured using the power meter 47, it is preferable to consider the loss in the polarization beam splitter 68, the polarization rotator 69, and the grating coupler 65 provided between the optical modulator 20 and the power meter 47 (hereinafter, the TM path loss). Therefore, in the fourth embodiment, the loss in the grating coupler circuit 4 is estimated. At this time, the TE path loss and the TM path loss are respectively estimated.

Meanwhile, it is assumed that the losses in the respective grating couplers 61 through 65, 72, 76 and 77 are substantially the same. In addition, it is assumed that the loss in the polarization beam combiner and the loss in the polarization beam splitter are substantially the same. Hereinafter, the polarization beam combiner or the polarization beam splitter may be referred to as the "PBC/PBS".

When estimating the TE path loss, the TE wave optical signal generated by the light source 31 and the polarization controller 32 is input to the grating coupler 62 via the optical fiber array 102. The TE wave optical signal is branched by the tap waveguide 73 and guided to the polarization beam splitter 74. The polarization beam splitter 74 guides the TE wave optical signal to the grating coupler 76. Therefore, the TE wave optical signal (that is, the reference light R_TE) is guided to the power meter 112 via the optical fiber array 102 and the optical switch 111. Then, the power meter 112 measures the power of the reference light R_TE.

Here, it is assumed that the input power of the TE wave optical signal input to the grating coupler circuit 4 from the polarization controller 32 is known. The branching ratio of the tap waveguides 73 is known. Then, according to the input power of the TE wave optical light and the power of the reference light R_TE measured by the power meter 112, the losses in the path for the TE wave from the polarization controller 32 to the power meter 112 is calculated.

The grating coupler 62, the polarization beam combiner 67, the polarization beam splitter 74, and the grating coupler 76 exist on this path. That is, two grating couplers and two PBC/PBSs exist on this path. Therefore, the TE path loss is estimated by dividing the losses mentioned above by "2".

When estimating the TM path loss, the TE wave optical signal generated by the light source 31 and the polarization controller 32 is input to the grating coupler 61 via the optical fiber array 102. The TE wave optical signal is converted into the TM wave optical signal at the polarization rotator 66. After passing through the polarization beam combiner 67, the TM wave optical signal is branched by the tap waveguide 73 and guided to the polarization beam splitter 74. The polarization beam splitter 74 guides the TM wave optical signal to the polarization rotator 75. Therefore, the TE wave optical signal (that is, the reference light R_TM) is guided to the power meter 112 via the optical fiber array 102 and the optical switch 111. Then, the power meter 112 measures the power of the reference light R_TM.

Here, as mentioned above, it is assumed that the input power of the TE wave optical signal is known. In addition, the branching ratio of the tap waveguide 73 is known. Then, according to the input power of the TE wave optical light and the power of the reference light R_TM measured by the power meter 112, the losses in the path for the TM wave from the polarization controller 32 to the power meter 112 is calculated.

The grating coupler 61, the polarization rotator 66, the polarization beam combiner 67, the polarization beam splitter 74, the polarization rotator 75, and the grating coupler 76 exist on this path. That is, two grating couplers, two polarization rotators, and two PBC/PBSs exist on this path. Therefore, the TM path loss is estimated by dividing the losses mentioned above by "2".

The power of the CW light input to the optical device is estimated using the CW light branched by the tap waveguide 71. Specifically, it is assumed that the input power of the CW light input to the grating coupler circuit 4 from the polarization controller 42 is known. In addition, the branching ratio of the tap waveguide 71 is known. Then, by estimating the power of the reference light R_CW using the power meter 112, the power of the CW light input to the optical device is estimated.

The power of the TE wave component of the modulated optical signal generated by the optical device is calculated by adding the TE path loss described above to the power measured by the power meter 46. Therefore, by calculating the ratio of the power of the CW light input to the optical device and the power of the TE wave component of the modulated optical signal generated by the optical device, it is possible to detect the characteristics of the optical modulator 20 regarding the TE wave.

In a similar manner, the power of the TM wave component of the modulated optical signal generated by the optical device is calculated by adding the TM path loss described above to the power measured by the power meter 47. Therefore, by calculating the ratio of the power of the CW light input to the optical device and the power of the TM wave component of the modulated optical signal generated by the optical device, it is possible to detect the characteristics of the optical modulator 20 regarding the TM wave.

As described above, according to the fourth embodiment, it is possible to estimate the loss in the grating coupler, the PBC/PBS, the polarization rotator, and therefore, the characteristics of the optical device are accurately measured.

Fifth Embodiment

In the grating coupler circuit according to the fourth embodiment, the number of grating couplers becomes large, and the area for forming the grating coupler becomes large. In addition, the number of fibers in the optical fiber array also becomes large. In the fifth embodiment, these problems are alleviated.

Figure 11:
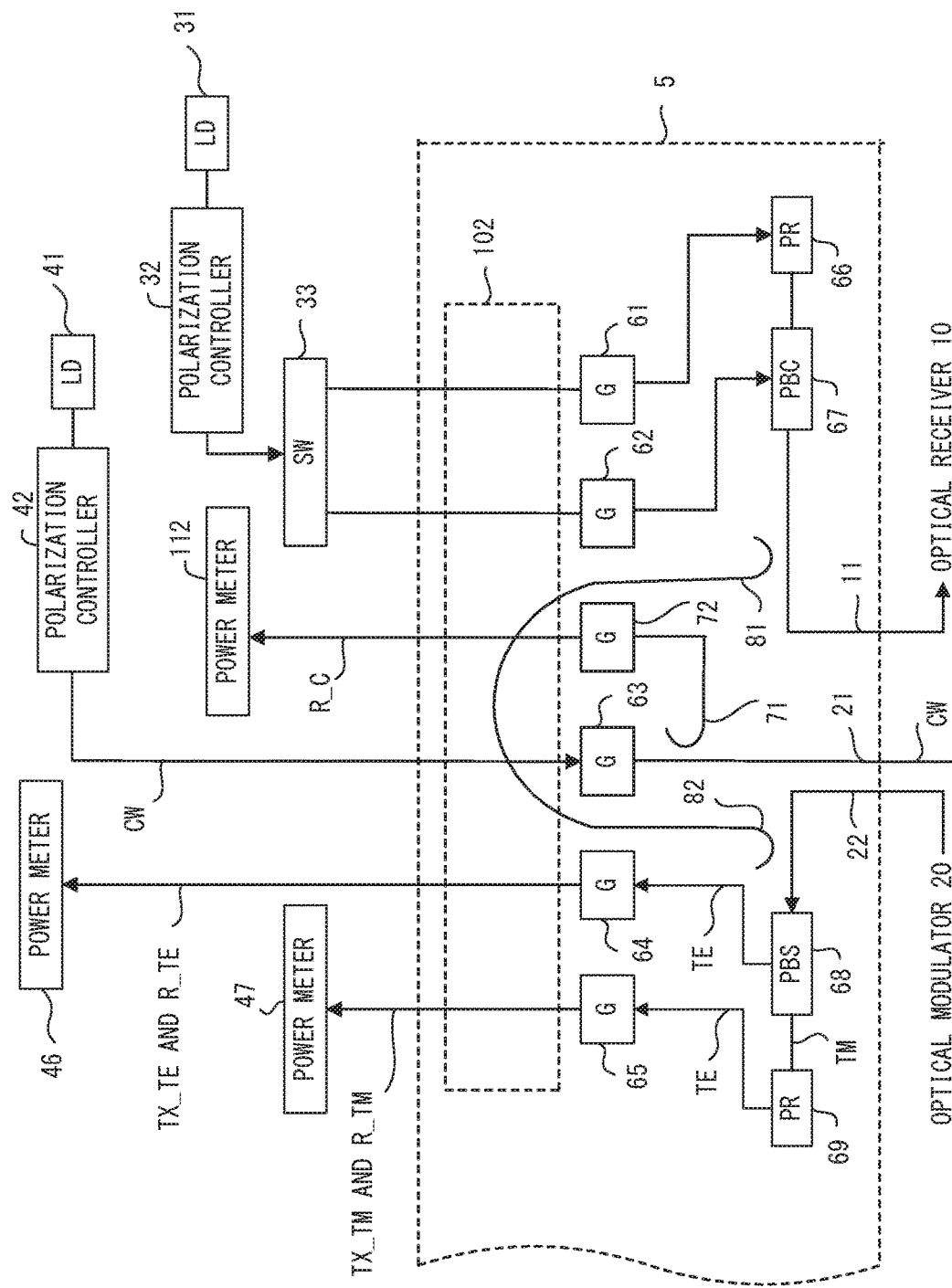
FIG. 11 illustrates an example of a grating coupler circuit according to the fifth embodiment.

FIG. 11 illustrates an example of the grating coupler circuit according to the fifth embodiment. In a similar manner as in the fourth embodiment, a grating coupler circuit 5 according to the fifth embodiment may also be applied to both the first embodiment and the second embodiment.

The grating coupler circuit 5 in the fifth embodiment is equipped with a tap waveguide 81 and a combining waveguide 82, instead of the tap waveguide 73, the polarization beam splitter 74, the polarization rotator 75, and the grating couplers 76, 77 illustrated in FIG. 10. The tap waveguide 81 branches the output signal of the polarization beam combiner 67, in a similar manner as the tap waveguide 73 illustrated in FIG. 10. Here, the tap waveguide 81 is coupled to the combining waveguide 82 through an optical waveguide. In addition, the combining waveguide is coupled to the polarization beam splitter 68. Therefore, the light branched from the optical waveguide 11 by the tap waveguide 81 is guided to the polarization beam splitter 68. Meanwhile, the tap waveguide 81 and the combining waveguide 82 may be respectively realized by an MMI coupler or a directional coupler.

In the configuration illustrated in FIG. 11, it is assumed that, when estimating the loss in the grating coupler circuit 5, the modulated optical signal is not input to the grating coupler circuit 5 from the optical modulator 20. In addition, the configuration in which the power of the CW light is measured using the tap waveguide 71, the grating coupler 72, and the power meter 112 is substantially the same in the fourth and fifth embodiments.

When the TE wave optical signal generated by the light source 31 and the polarization controller 32 is input to the grating coupler 62, the TE wave optical signal is guided to the power meter 46 via the polarization beam combiner 67, the tap waveguide 81, the combining waveguide 82, the polarization beam splitter 68, and the grating coupler 64. That is, in a similar manner as in the fourth embodiment, the optical signal passes through the two grating couplers and two PBC/PBSs. Therefore, the TE path loss is calculated in a similar manner as in the fourth embodiment.

When the TE wave optical signal generated by the light source 31 and the polarization controller 32 is input to the grating coupler 61, the TE wave optical signal is guided to the power meter 47 via the polarization rotator 66, the polarization beam combiner 67, the tap waveguides 81, the combining waveguide 82, the polarization beam splitter 68, the polarization rotator 69, and the grating coupler 65. That is, in a similar manner as in the fourth embodiment, the optical signal passes through two grating couplers, two polarization rotators, and two PBC/PBSs. Therefore, the TM path loss is calculated in a similar manner as in the fourth embodiment.

As described above, in the fifth embodiment, the power of the reference lights (R_TE, R_TM) is measured using the power meters 46, 47 for measuring the power of the modulated optical signal. For this reason, compared to the fourth embodiment illustrated in FIG. 10, the number of grating couplers becomes small, and the area for forming the grating coupler becomes small. In addition, the number of fibers of the optical fiber array also becomes small.

Sixth Embodiment

In the fifth embodiment, there may be a large loss in the multiplexing waveguide 82. In the sixth embodiment, this problem is alleviated.

Figure 12:
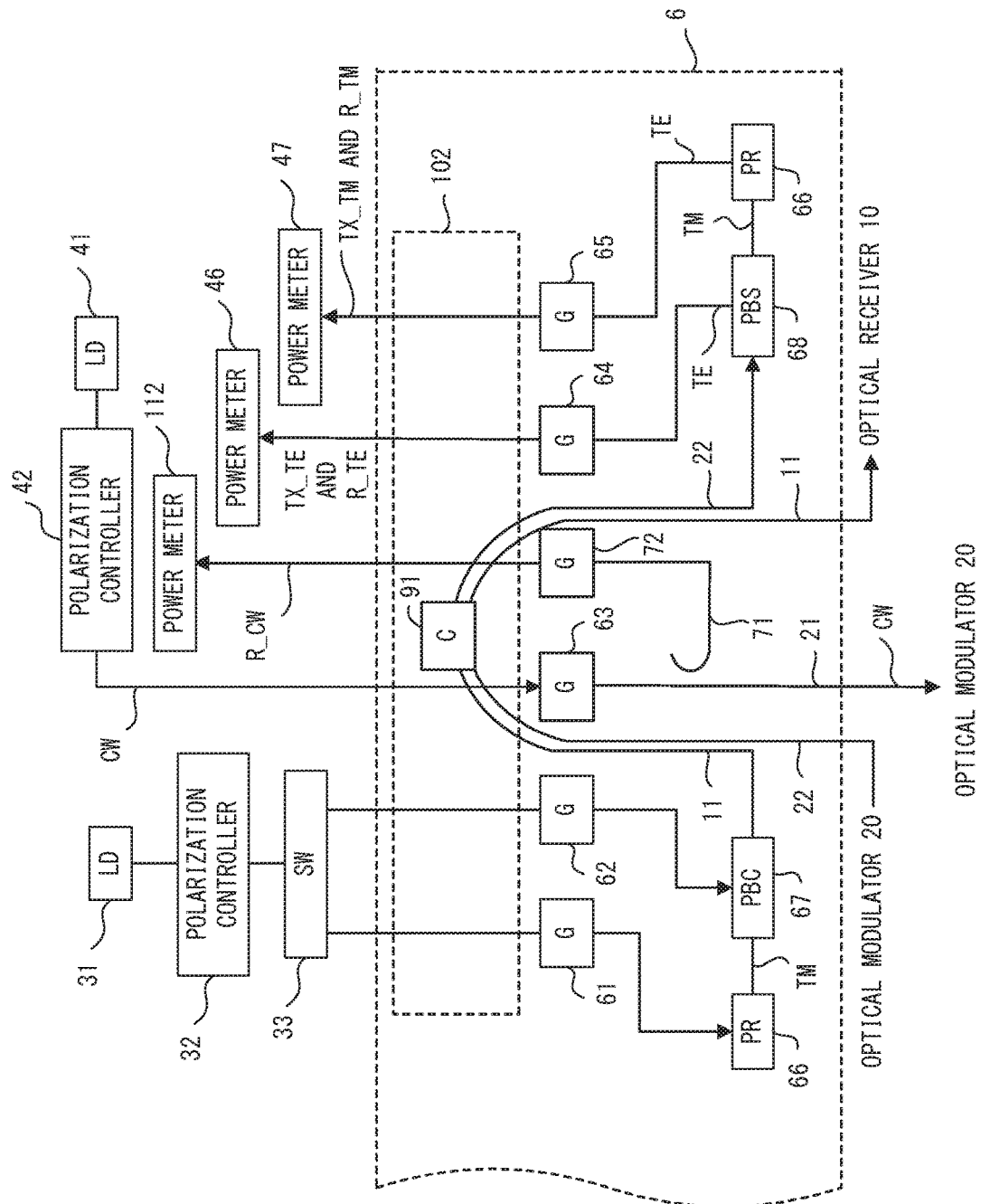
FIG. 12 illustrates an example of a grating coupler circuit according to the sixth embodiment.

FIG. 12 illustrates an example of the grating coupler circuit according to the sixth embodiment. In a similar manner as in the fourth embodiment, a grating coupler circuit 6 according to the fifth embodiment may also be applied to both the first embodiment and the second embodiment.

The grating coupler circuit 6 according to the sixth embodiment is equipped with a 2×2 coupler 91 instead of the tap waveguide 81 and the combining waveguide 82 illustrated in FIG. 11. The 2×2 coupler 91 has a first input port, a second input port, a first output port, and a second output port. The first input port is coupled to the polarization beam combiner 67 via the optical waveguide 11. The second input port is coupled to the optical modulator 20 via the optical waveguide 22. The first output port is coupled to the optical receiver 10 via the optical waveguide 11. The second output port is coupled to the polarization beam splitter 68 via the optical waveguide 22. Meanwhile, the 2×2 coupler 91 may be realized by an MMI coupler or a directional coupler. In addition, the method for estimating the loss of the grating coupler circuit is substantially the same in the fifth and sixth embodiments.

Optical Module

Figure 13:
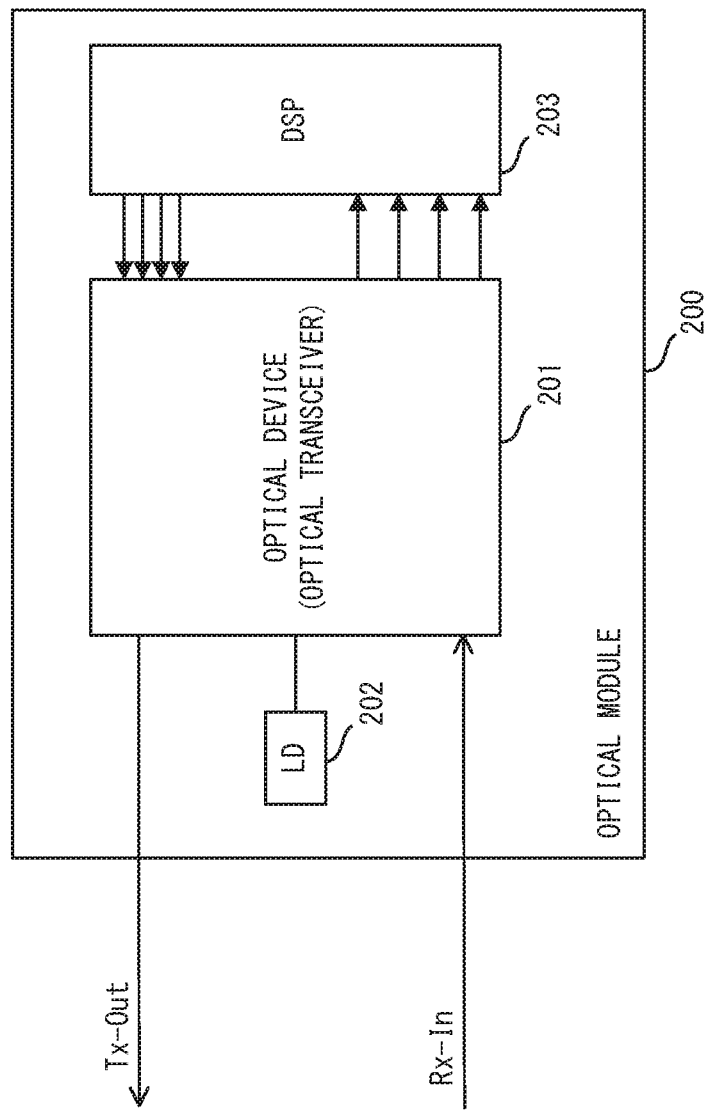
FIG. 13 illustrates an example of an optical module.

FIG. 13 illustrates an example of the optical module according to the embodiments of the present invention. An optical module 200 is equipped with an optical device 201, a light source (LD) 202, and a digital signal processor (DSP) 203.

The optical device 201 is realized by the optical IC chip 1 illustrated in FIG. 4 and FIG. 6 through FIG. 8. The optical device 201 is equipped with the optical receiver 10, the optical modulator 20, and the optical waveguides 11, 21, 22. The light source 202 generates CW light. The CW light is guided to the optical device via the optical waveguide 21. The received optical signal (Rx_In) at the optical device 201 is input to the optical waveguide 11. The modulated optical signal (Tx_Out) generated by the optical modulator 20 is output via the optical waveguide 22. The digital signal processor 203 generates a data signal for generating a modulated optical signal in the optical device 201. Meanwhile, the digital signal processor 203 processes an electric signal that represents the received optical signal at the optical device 201.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical IC chip comprising:
an optical receiver;
a first optical waveguide that is coupled to the optical receiver;
a polarization beam combiner that is coupled to the first optical waveguide;
a first polarization rotator that is coupled to the polarization beam combiner;

a first grating coupler that is coupled to the first polarization rotator;
a second grating coupler that is coupled to the polarization beam combiner;
an optical modulator;
a second optical waveguide that is coupled to the optical modulator;
a third grating coupler that is coupled to the second optical waveguide;
a third optical waveguide that is coupled to the optical modulator;
a first polarization beam splitter that is coupled to the third optical waveguide;
a fourth grating coupler that is coupled to the first polarization beam splitter;
a second polarization rotator that is coupled to the first polarization beam splitter;
a fifth grating coupler that is coupled to the second polarization rotator;
a first tap waveguide that branches light propagating via the second optical waveguide;
a sixth grating coupler that is coupled to the tap first waveguide;
a second tap waveguide that branches light propagating via the first optical waveguide branch;
a second polarization beam splitter that is coupled to the second tap waveguide;
a seventh grating coupler that is coupled to the second polarization beam splitter;
a third polarization rotator that is coupled to the second polarization beam splitter; and
an eighth grating coupler that is coupled to the third polarization rotator.

2. An optical device that is formed on an optical IC chip, wherein the optical IC chip includes:
an optical receiver;
a first optical waveguide that is coupled to the optical receiver;
a polarization beam combiner that is coupled to the first optical waveguide;
a first polarization rotator that is coupled to the polarization beam combiner;
a first grating coupler that is coupled to the first polarization rotator;
a second grating coupler that is coupled to the polarization beam combiner;
an optical modulator;
a second optical waveguide that is coupled to the optical modulator;
a third grating coupler that is coupled to the second optical waveguide;
a third optical waveguide that is coupled to the optical modulator;
a first polarization beam splitter that is coupled to the third optical waveguide;
a fourth grating coupler that is coupled to the first polarization beam splitter;
a second polarization rotator that is coupled to the first polarization beam splitter;
a fifth grating coupler that is coupled to the second polarization rotator;
a first tap waveguide that branches light propagating via the second optical waveguide;
a sixth grating coupler that is coupled to the first tap waveguide;
a second tap waveguide that branches light propagating via the first optical waveguide branch;
a second polarization beam splitter that is coupled to the second tap waveguide;
a seventh grating coupler that is coupled to the second polarization beam splitter;
a third polarization rotator that is coupled to the second polarization beam splitter; and
an eighth grating coupler that is coupled to the third polarization rotator, and the first through third optical waveguides respectively extend to an edge of the optical IC chip.

3. An optical transceiver module comprising:
an optical device;
a light source; and
a digital signal processor that generates a data signal for generating a modulated optical signal at the optical device and processes an electric signal representing a received optical signal at the optical device,
wherein the optical device is formed on an optical IC chip, the optical IC chip includes:
an optical receiver;
a first optical waveguide that is coupled to the optical receiver;
a polarization beam combiner that is coupled to the first optical waveguide;
a first polarization rotator that is coupled to the polarization beam combiner;
a first grating coupler that is coupled to the first polarization rotator;
a second grating coupler that is coupled to the polarization beam combiner;
an optical modulator;
a second optical waveguide that is coupled to the optical modulator;
a third grating coupler that is coupled to the second optical waveguide;
a third optical waveguide that is coupled to the optical modulator;
a first polarization beam splitter that is coupled to the third optical waveguide;
a fourth grating coupler that is coupled to the first polarization beam splitter;
a second polarization rotator that is coupled to the first polarization beam splitter;
a fifth grating coupler that is coupled to the second polarization rotator;
a first tap waveguide that branches light propagating via the second optical waveguide;
a sixth grating coupler that is coupled to the first tap waveguide;
a second tap waveguide that branches light propagating via the first optical waveguide branch;
a second polarization beam splitter that is coupled to the second tap waveguide;
a seventh grating coupler that is coupled to the second polarization beam splitter;
a third polarization rotator that is coupled to the second polarization beam splitter; and
an eighth grating coupler that is coupled to the third polarization rotator,
the first through third optical waveguides respectively extend to an edge of the optical IC chip,
a received optical signal at the optical device is input to the first optical waveguide;
continuous wave light generated by the light source is guided to the second optical waveguide; and a modulated optical signal generated by the optical modulator is output via the third optical waveguide.

\* \* \* \* \*